(12) United States Patent
Sugauchi et al.

(10) Patent No.: US 6,862,619 B1
(45) Date of Patent: Mar. 1, 2005

(54) NETWORK MANAGEMENT SYSTEM EQUIPPED WITH EVENT CONTROL MEANS AND METHOD

(75) Inventors: Kiminori Sugauchi, Toki (JP); Kenichi Yoshida, Kitamoto (JP); Kanako Shoji, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 477 days.

(21) Appl. No.: 09/657,655

(22) Filed: Sep. 7, 2000

(30) Foreign Application Priority Data

Sep. 10, 1999 (JP) .......................................... 11-256724

(51) Int. Cl.[7] .......................................... G06F 15/173
(52) U.S. Cl. ..................................... 709/224; 709/225
(58) Field of Search ............................... 709/223–224, 709/225; 345/734–736; 714/4

(56) References Cited

U.S. PATENT DOCUMENTS

| | | | | |
|---|---|---|---|---|
| 5,519,863 A | * | 5/1996 | Allen et al. .................. 709/318 |
| 6,052,722 A | * | 4/2000 | Taghadoss .................. 709/223 |
| 6,131,112 A | * | 10/2000 | Lewis et al. ................. 709/207 |
| 6,301,624 B1 | * | 10/2001 | Lee et al. .................... 709/318 |
| 6,314,533 B1 | * | 11/2001 | Novik et al. .................. 714/39 |
| 6,351,213 B1 | * | 2/2002 | Hirsch ........................ 340/506 |
| 6,404,743 B1 | * | 6/2002 | Meandzija ................... 370/254 |
| 6,405,250 B1 | * | 6/2002 | Lin et al. ..................... 709/224 |
| 6,513,129 B1 | * | 1/2003 | Tentij et al. ................... 714/4 |
| 6,564,341 B1 | * | 5/2003 | Sundaram et al. ............. 714/43 |

FOREIGN PATENT DOCUMENTS

| | | |
|---|---|---|
| JP | 5-75608 | 3/1993 |
| JP | 10-336276 | 12/1998 |

OTHER PUBLICATIONS

CCITT, Recommendation X.734, pp. 1–18, 1993.

* cited by examiner

*Primary Examiner*—Larry D. Donaghue
(74) *Attorney, Agent, or Firm*—Mattingly, Stanger, Malur & Brundidge, P.C.

(57) ABSTRACT

A network management system and method comprising a network device and a managing apparatus that manages the network device. The managing apparatus has an event issuing control condition decision unit that determines the event issuing control condition of the network device according to the event processing capability of the managing apparatus, and a notifying unit that notifies the event issuing control conditions to the network device. The network device performs the event issuing control according to the event issuing control condition notified from the managing apparatus.

10 Claims, 12 Drawing Sheets

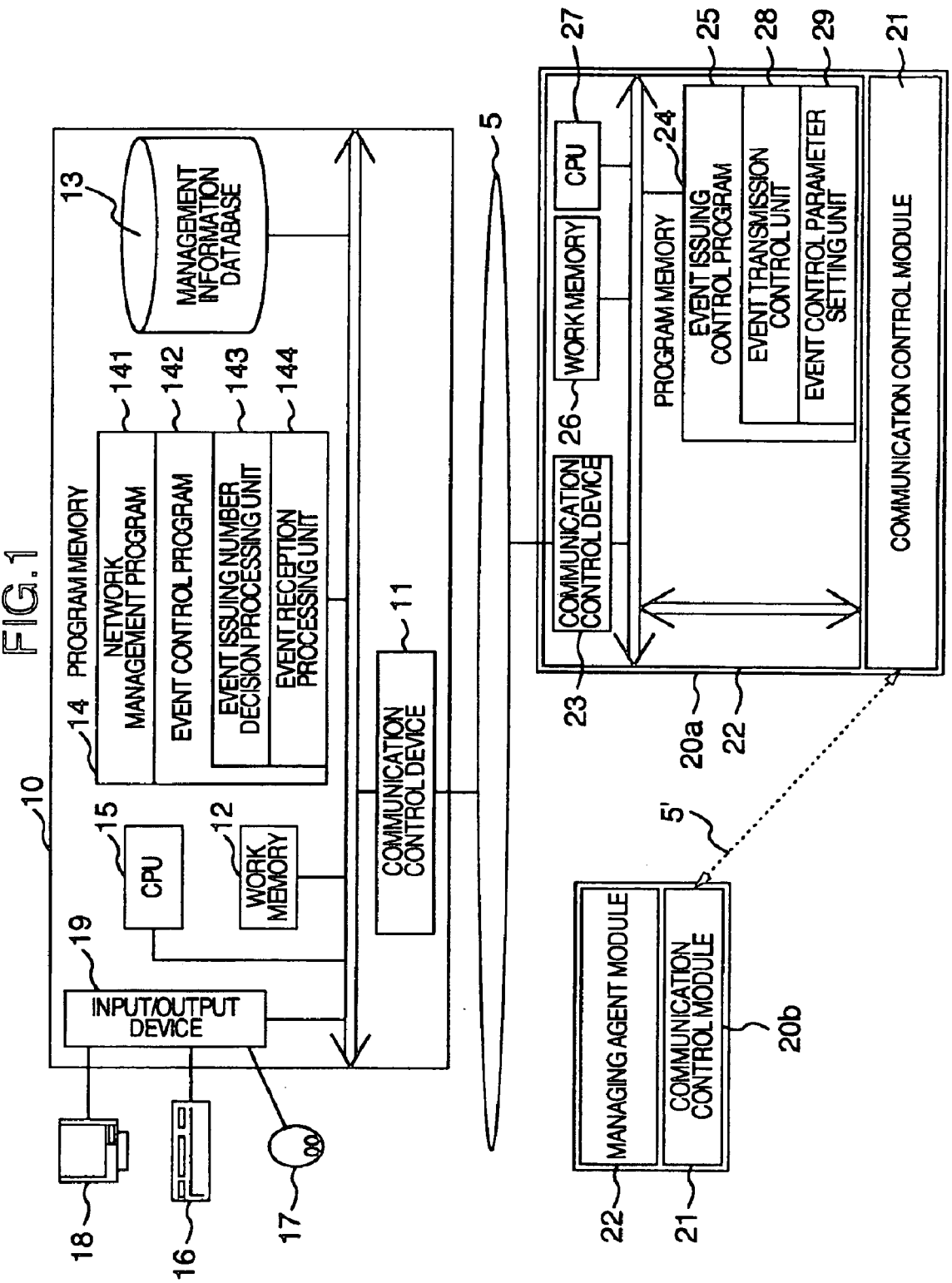

FIG.2

| | | | |
|---|---|---|---|
| OBJECT (211) | NE01 | | |
| UPPER LEVEL CONFIGURATION (212) | NONE (213) | | (214) |
| RESOURCE | OPERATIONAL STATE | ENABLE | |
| | ADMINISTRATIVE STATE | OPERATIONAL | |
| | ⋮ | ⋮ | |
| OBJECT | PORT 11 | | |
| UPPER LEVEL CONFIGURATION | NE 01 | | |
| RESOURCE | OPERATIONAL STATE | ENABLE | |
| | ADMINISTRATIVE STATE | OPERATIONAL | |
| | ⋮ | ⋮ | |

⟩ 210

| |
|---|
| 1999/1/23/19:15; STATECHANGE; PORT 01 (221) |
| ⋮ |

⟩ 220

| MANAGEMENT REQUEST (231) | EVENT TYPE (232) | DEVICE TYPE (233) | RESOURCE TYPE (234) |
|---|---|---|---|
| STATE CHECK | STATE CHANGE | ATM | CTP |
| COMMUNICATION FAILURE | COMMUNICATION ALARM | ATM | CTP |
| | | | TTP |
| ⋮ | ⋮ | ⋮ | ⋮ |

⟩ 230

| NUMBER OF EVENTS THAT CAN BE PROCESSED (240) | 100000000 |
|---|---|

| GROUP ID (251) | CONSTITUTIONAL ELEMENT (252) |
|---|---|
| GROUP A | NE 01, NE 02, NE 03, NE 04, NE 05, NE 06, NE 07, NE 08, |
| GROUP B | NE 09, NE 10, NE 11, NE 12, NE 13, NE 14, NE 15, NE 16, |

⟩ 250

| USER ID (261) | USR000001 | | | | |
|---|---|---|---|---|---|
| PRIORITY LEVEL (262) | 1 | | | | |
| MANAGEMENT REQUEST (263) | STATE CHECK, COMMUNICATION FAILURE | | | | |
| AVAILABLE PATH (264) | (DEVICE) | NE01 | NE02 | NE03 | ... |
| | (RESOURCE) | PORT 11 PORT 12 | PORT 22 PORT 25 | PORT 32 PORT 35 | ... |
| | ⋮ | ⋮ | ⋮ | | |

⟩ 260

401: NOTIFICATION OF EVENT FILTER CONTROL INFORMATION
402: NOTIFICATION OF FILTERING PARAMETER
403: NOTIFICATION OF EVENT ISSUING
404: EVENT
405: NOTIFICATION AND STORAGE OF EVENT

FIG.6

| ALLOWABLE EVENT NUMBER | 300 |
|---|---|

Event Transmission Information (603):

| EVENT TYPE | EVENT PRIORITY LEVEL | EVENT CONDITION |
|---|---|---|
| COMMUNICATION ALARM | 1 | CLASS CTP, RDN = "Port 11" |
| COMMUNICATION ALARM | 3 | CLASS CTP, RDN = "Port 12" |
| ⋮ | ⋮ | ⋮ |

Group Information (607):

| NETWORK DEVICE | ALLOWABLE EVENT NUMBER |
|---|---|
| NE02 | 200 |
| NE03 | 250 |
| ⋮ | ⋮ |

1101: EVENT TYPE AND SETTING PATH
1102: MOVING
1103: COLLECTION OF EVENT FILTER INFORMATION, CHANGE OF FILTERING CONDITION
1104: MOVING TO OTHER NETWORK DEVICE
1105: MOVING
1106: NOTIFICATION OF INCREASED OR DECREASED NUMBER OF EVENTS ISSUED FROM NETWORK DEVICE ON SET PATH
1107: NOTIFICATION OF ALLOWABLE EVENT NUMBER

NETWORK MANAGEMENT SYSTEM EQUIPPED WITH EVENT CONTROL MEANS AND METHOD

BACKGROUND OF THE INVENTION

The present invention relates to a technology for notifying events to a managing apparatus that manages network devices making up a network.

A network management system comprises managing agents that manage individual network devices and a managing apparatus that collects information from these managing agents. In this architecture the state of the network is checked and managed by a single managing apparatus accessing a plurality of managing agents or by the managing apparatus receiving events issued voluntarily from the managing agents.

As for the event issuing control on the part of the managing agents, the Recommendation X.734: Information Technology—Open Systems Interconnection—Systems Management—Part 5: Event Report Management Function specifies an event forwarding discriminator as the standard of the International Telecommunication Union—Telecommunication (ITU-T). The event forwarding discriminator decides whether or not to notify an internal event or state change notification within a network device received by the managing agent to the managing apparatus under a certain condition. The conditions of the event forwarding discriminator include time and network resources to be issued.

JP-A-5-75608 proposes a technology whereby the managing agent creates an event forwarding discriminator for each management function of the managing apparatus to simplify the event processing on the part of the managing apparatus and transmits an event required by the management function.

JP-A-10-336276 proposes a technology whereby a function to monitor event filtering processing is provided in the managing apparatus and, when the load of the managing apparatus increases, the filtering condition is changed and the event is notified to a managing application while keeping the event processing under a certain load.

In a managing system that manages a network to offer a variety of network services to a plurality of users, it may become necessary to manage network paths of individual users of the network in addition to the management of the entire network centering on the checking of the network configuration and the monitoring and control of traffic among network devices.

In such a case, in addition to forwarding the state of a device object itself it is also necessary to know the states of resources used to configure the network paths of the users. This increases the amount of information that needs to be reported from the device object to the managing apparatus, increasing the number of events forwarded from each managing agent. Hence, if the managing agents perform the event filtering and the transmission control, this reduces only the number of events reported from each managed object. Because the managing agents are not aware of the capability of the managing system and how many events are being reported from other managed objects, there remains a possibility that the total number of events issued from all managed objects may exceed the number of events that can be handled by the managing apparatus.

For the same reason, even if the filtering is controlled by the managing apparatus, when the total number of events notified from the managing agents is large, the filtering function can only perform simple processing at all times, which does not make sense.

The similar problems occur not only when the management requests diversify but also when the size of the network to be managed increases or when the managing apparatus becomes complicated due to changes made to the configuration of the network devices. Generally, a failure that occurs in the network affects a plurality of managed objects, so the managing apparatus receives events from all the affected managed objects at the same time. Therefore, as the network increases in size, the number of network devices as the managed objects increases. This in turn increases the total number of events that need to be processed by the managing apparatus even when the number of events reported from each managed object is small, with the result that the total number of events may exceed the event processing capability of the managing apparatus. Furthermore, as the network devices become complex, the number of events representing their behaviors also increases, which means that the number of events reported from each device increases, giving rise to a possibility that the total number of events may exceed the event processing capability of the managing apparatus.

Further, when the managing system performs individual management according to the requests from the network users, the network resources used by the user must be managed for different management requests. This means that the events reported from the network devices have different levels of importance depending on the user management requests even when the events are of the same kind from different resources. This requires processing which ensures that the managing apparatus receives an event with a higher level of importance. The conventional event control performed by the managing agents is the event filtering that only determines whether or not to send an event report to the managing apparatus and does not include a priority transmission control that discriminates between events of the same kind that have occurred simultaneously.

Therefore, when events more than the event handling capability of the managing apparatus should occur, there is a possibility that an important event, if it is sent to the managing apparatus, may not be able to be received by the managing apparatus.

Another possibility is that the functions and services provided by the network management system may no longer be guaranteed.

SUMMARY OF THE INVENTION

An object of the present invention is to solve the above-described problems and to provide a technology which realizes on the network devices an event issuing control that is aware of the event handling capability of the managing apparatus and thereby keeps the events notified to the managing apparatus within the event handling capability of the managing apparatus.

Another object of the present invention is to provide a technology which realizes on the network devices an event issuing control that is aware of the event handling capability of the managing apparatus to ensure that the managing apparatus can reliably process the events notified.

Still another object of the present invention is to provide a technology that, even when an event control is performed on the network devices, enables the events associated with a user with high level of importance to be preferentially transmitted to the managing apparatus.

To achieve the above objectives, the present invention limits the number of events in the network as a whole to the level that can be tolerated by the managing apparatus, by the steps of: determining for each managing agent the number of events that can be notified to the managing apparatus while considering the event processing capability of the managing apparatus; and setting by the managing agent the filtering condition for notifying events based on the issuable event number given.

To describe in more concrete terms, the present invention is characterized in:

that the managing apparatus has an event issuing number decision processing unit which determines the number of events issued per unit time in each managing agent so that the event processing capability of the managing apparatus is not exceeded; and that the managing agent has an event issuing priority level setting processing unit that sets a filtering condition for performing the event issuing control based on the event issuing number limit notified from the event issuing number decision processing unit, and an event issuing control unit that performs the event issuing control and, when it is necessary to issue more events than the event issuing number limit, delays the issuing of those events in excess of the limit (i.e., imposing an upper limit on the number of events issued per unit time).

The invention is also characterized in that the event issuing number decision processing unit allocates priority levels to management requests from the users so that a greater number of events can be issued from the managing agent on a network device with high priority level.

The invention is further characterized in that the managing agent calculates, based on the allocated event issuing upper limit, the number of events that can be issued per unit time under the present situation and, if the calculated number is less than the allocated event issuing upper limit, notifies the calculated number to the event issuing number decision processing unit.

That is, in a network management system having a plurality of network devices and a managing apparatus that manages the network devices, for controlling the issuing of events from the network devices, there is provided a means which first selects events that need to be issued from each network device to manage the network and, based on the number of events to be issued, controls the number of events issued per unit time from each network device so that the number of events issued per unit time falls within the number of events that can be processed per unit time by the managing apparatus.

Information for realizing a part or all of the functions of these means may be introduced to each device in advance or through portable memory media, such as floppy disk and magnetic disk, or communication media or transmission media.

BRIEF DESCRIPTION OF THE DRAWINGS

FIG. 1 is a schematic diagram showing a system configuration of a first embodiment of the present invention.

FIG. 2 is a diagram showing information groups contained in a management information database used in the first embodiment of the invention.

FIG. 6 is a diagram showing one embodiment of report information for event filter to be sent from the managing apparatus to a network device in the first embodiment of the invention.

DESCRIPTION OF THE EMBODIMENTS

Figure 3:
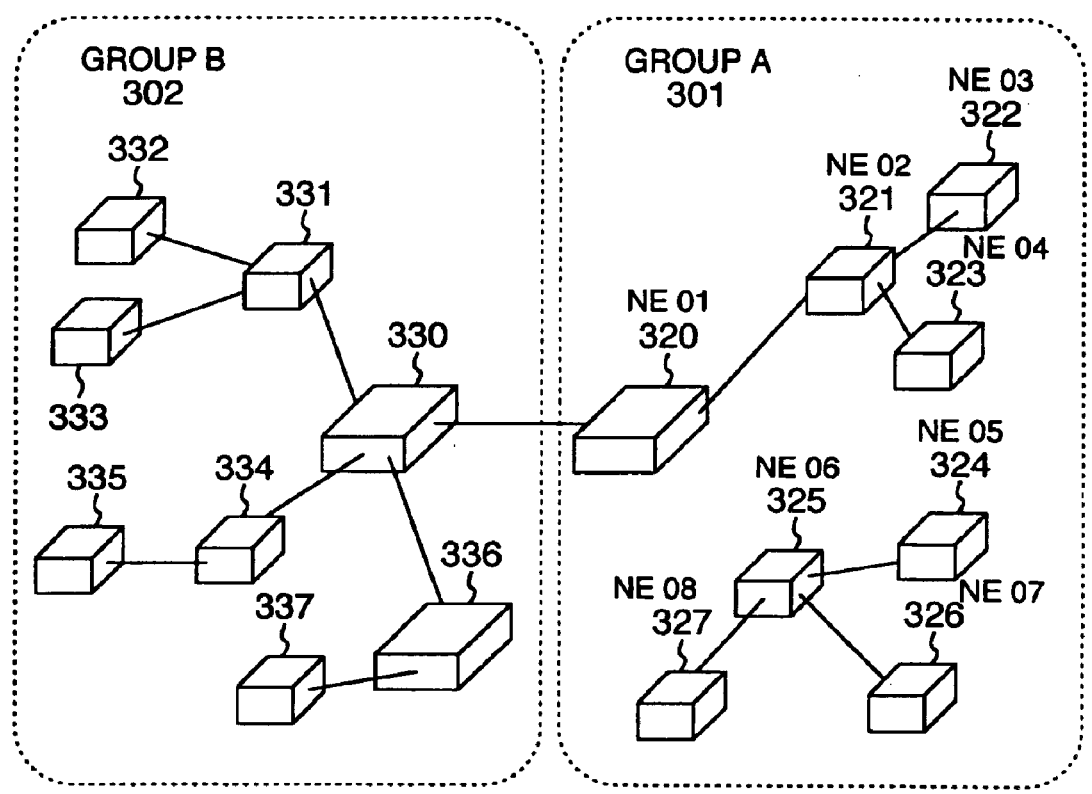
FIG. 3 is a diagram showing an example embodiment of a network managed by the invention.

Embodiments of the present invention will be described by referring to the accompanying drawings.

The first embodiment of the invention will be explained by referring to FIGS. 1 to 9.

FIG. 1 shows one embodiment of a system configuration when an event control system based on this invention is applied to the managing apparatus that manages network devices and to the network devices. plurality of network devices (20*a, b*) transmit management information to management apparatus 10 via managing network 5. In this system, the users of a network 5' having a plurality of network devices 20*a*, 20*b* (two network devices in this example) are provided with a management service which, when a failure occurs on a network device, informs the affected users of the failure. To realize this service, the managing apparatus 10 has configuration information on a plurality of the network devices 20*a*, 20*b* and user information as to which network devices in the network the users are using. In the event of a failure, the managing apparatus 10 notifies an event reported from the associated network device to a managing operator. The managing operator, based on the reported failure information, informs the users that a failure has occurred.

The managing apparatus 10 has a communication control device 11 to control communication for collecting management information from the network devices in the managed object network; a work memory 12 used to perform calculation in executing programs and to store the calculated results; a database 13 to store information associated with the management of the network devices and the managing apparatus; a program memory 14 storing a variety of management programs, such as a network management program 141 to execute managing operations on the network devices, process received events and store management information in the database and an event control program 142 to perform a transmission control associated with events received from the network devices; a central processing unit (CPU) 15 to control the access to the program memory and database and also the execution of various programs; input devices such as keyboard 16 and mouse 17; a display (CRT) 18; and an input/output control unit 19 to control the input and output.

The event control program 142 is divided largely into two units: an event issuing number decision processing unit 143 and an event reception processing unit 144. The event issuing number decision processing unit 143 determines the number of events that can be issued to each network device based on the performance of the managing apparatus 10 and the path information allocated to the customers. The event reception processing unit 144 receives an event notified from the network device to the network management program 141.

FIG. 2 shows information stored in the management information database 13. The management information database 13 has managed object information 210 on the devices making up each network and the device elements. The managed object information 210 includes configuration information representing object names 211 for identifying managed objects and an upper-level configuration 212 showing the relation among the managed objects, and resource information representing managed attributes 213, such as resources of the managed objects, and their values 214. These information is modified, added or deleted by the network management program and an operator in charge of operation and management. These information further includes log information 220 regarding events 221 notified from the managed objects.

The management information database 13 further includes an event related table 230 which represents a relation among a type of event 232 required to meet an arbitrary management request 231, a type of network device 233 that issues the event, and a resource type of the device 234.

In a management based on the OSI (Open systems Interconnection), for example, the resource and management function of each network device are defined as managed objects. A state change notification and a failure information notification from the managed objects are defined as notifications. Hence, the type of event is a type of notification reported from the managed object; the type of device is a class representing a network device; and a resource type is a name of the type (i.e., class) of a managed object that issues a notification.

Although this embodiment assumes that the management configuration is based on the OSI, these information can be generated by the network management based on the SNMP (Simple Network Management Protocol). In the case of the network management based on the SNMP, events are defined as traps. In the network management according to the SNMP, however, a resource trap is issued from the managing agent module, not from the network device as in the OSI-based management. The decision as to which resource a state change or failure notification refers to depends on an enterprise specific trap identifier allocated to the trap or information accompanying the trap. In many SNMP-based network managements, the managing apparatus 10 polls arbitrary network resource information to check for a state change occurring in the network devices. In this invention, the event transmission control unit on the network device replaces the function of polling the network resources.

In this case, in the event related table 230, the resource type is replaced with an object identifier and the event type is set with a predefined enterprise specific trap identifier.

These information is used by the event issuing number decision processing unit 143 of the event control program 142. The event related table 230 is defined and stored in advance by an operator in charge of operation and management.

The management information database 13 stores the event processing capability of the managing apparatus 10 in the form of a per-unit-time event processing value 240. This is the number of events that can be processed by the event reception processing unit 144 of the event control program 142. For example, if, when the managing apparatus 10 receives events at intervals of 0.001 second on average from the network devices 20, all the received events can be notified to the network management program 141 or management information database 13 and if, when the events are received at shorter intervals, not all of the received events can be notified to the network management program 141 or management information database 13, then the managing apparatus 10 is said to be able to process events at the rate of 1000 events/second. Group configuration information 250, information on sub-networks into which the network configuration is reorganized, is stored separately. Suppose, for example, of the network devices of FIG. 3, those devices 320 to 327 are defined as one group A 301 and those 330 to 338 as another group B 302.

As the group configuration of the management database, the information on each group of devices is stored. The values stored at this time are identifiers of the managed objects corresponding to the network devices.

These identifier information is defined and stored beforehand by an operator in charge of operation and management. Alternatively, they may be automatically set by an evaluation program. These information is defined by the event issuing number decision processing unit 143 of the event control program 142.

The management information database 13 also stores a user profile 260 of the users of the network. The user profile includes network path information and management service information made available to the users. Profile data is prepared for each user. It includes a user identifier 261, a priority level 262 in providing management service to the user, a management request to the user 263, and an available path 264 paired with the network device or network resource used by the user. The priority level in providing management service to the user is a criterion by which to decide which user should first be given information when a plurality of users are using the network. For example, a user who should first be notified in the event of a failure is ranked "1" and a user who may be given information after some time is ranked "5". This is set by an operator in charge of operation and management.

The network device 20 has a communication control module 21 to actually transfer data and a managing agent module 22 to actually operate the communication control module 21. The managing agent module 22 forwards the management information collected or notified from the communication control module 21 to the managing apparatus 10 and receives requests from the managing apparatus 10.

The managing agent module 22 comprises: a communication control device 23 to communicate with the managing apparatus 10 and other network devices; a program memory 24 containing an event issuing control program 25 for, based on the management information received from the communication control module 21, generating and controlling an event to be notified to the managing apparatus 10; a work memory 26 used to execute programs; and a central processing unit (CPU) 27 to control the access to memory and the execution of programs. When the network device 20 is started, the event issuing control program 25 executes the management information collection processing and the forwarding processing on the work memory 26.

The event issuing control program 25 in the program memory 24 has an event transmission control unit 28 to notify an event to the managing apparatus 10 and an event control parameter setting unit 29 to determine a filtering condition and a transmission condition required for the filtering and event transmission processing performed by the event transmission control unit 28.

The communication module in the network device may have an independent communication control device to build a network 5', different from the network 5 used by the managing apparatus and the managing agent module, to provide the network service to the user. Or the network made available to the users may be the same network that is used by the managing apparatus 10 and the managing agent module for their communication.

Next, the outline of overall processing according to this invention will be explained.

Figure 4:
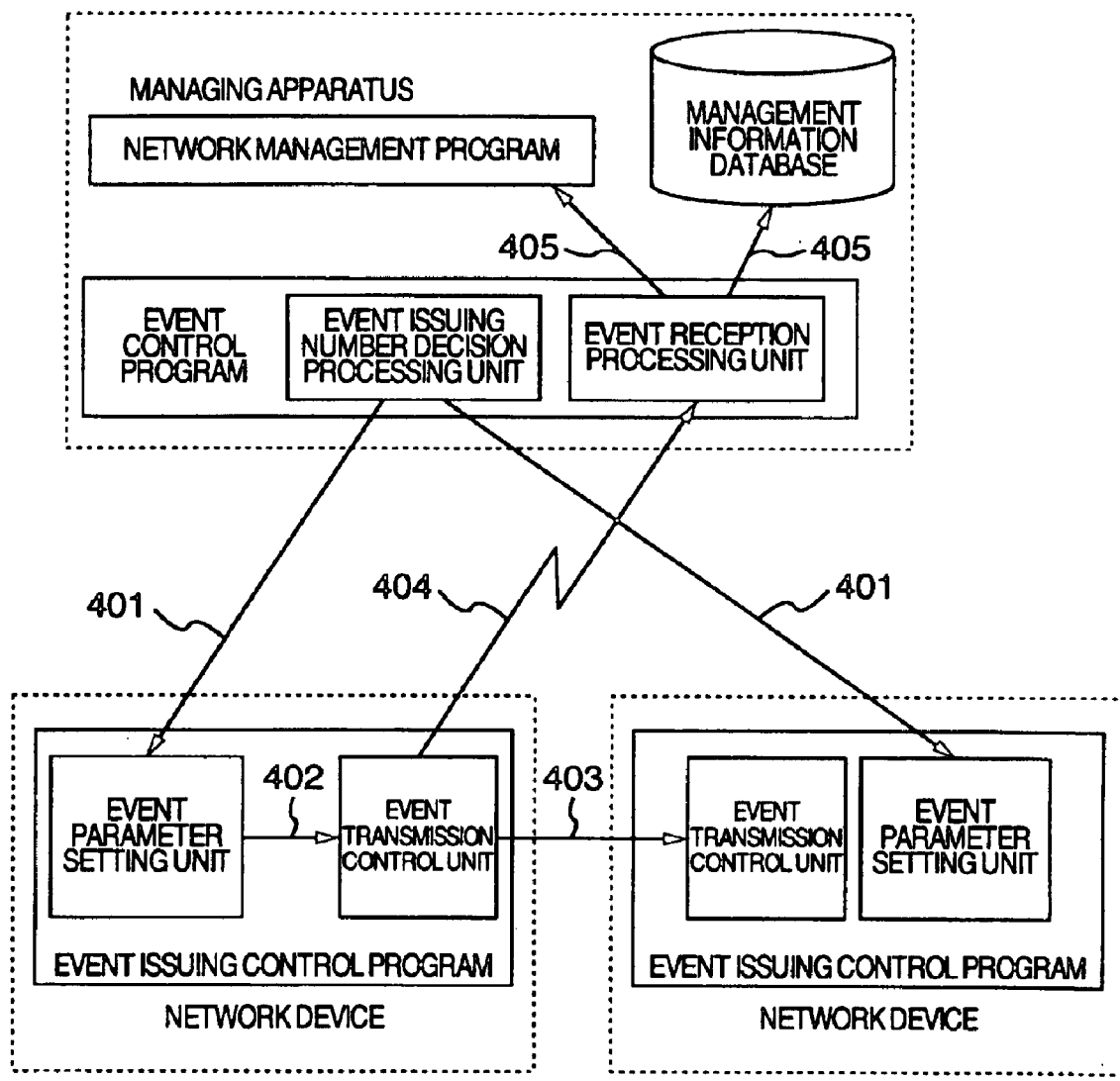
FIG. 4 is a diagram showing a relation among programs associated with the first embodiment of the invention.

FIG. 4 shows information transfer among programs in the above configuration.

Programs stored in program memories 14, 24 are executed in the work memories 12, 26 by the CPU's 15, 27.

In this embodiment, when the network service is started by the network apparatus or when the network configuration or communication service to the users is changed, the event issuing number decision processing unit 143 in the event control program 142 determines the number of events that can be notified by each network device 20a, 20b currently being managed and notifies the number of events to the event control parameter setting unit 29 in the managing agent module 22a on the network devices (401). Based on the information received, the event control parameter setting unit 29 of the program memory 24 on the network device 20a notifies a required filter parameter to the event transmission control unit 28 (402). The event transmission control unit 28 generates an event to be forwarded to the managing apparatus 10 based on the management information notified from the communication control module 21 and issues the event based on the filter parameter received from the event control parameter setting unit 29 (404). Before sending the event to the managing apparatus 10, the event transmission control unit 28 notifies the other network device 20b that it is going to send the event to the managing apparatus 10 (403). An event reception processing unit in the event control program on the managing apparatus 10 forwards the notified event to the management program and stores it in the management information database 13 as a log (405).

In the following we will explain the detail of the above processing associated with the operation of the invention.

Figure 5:
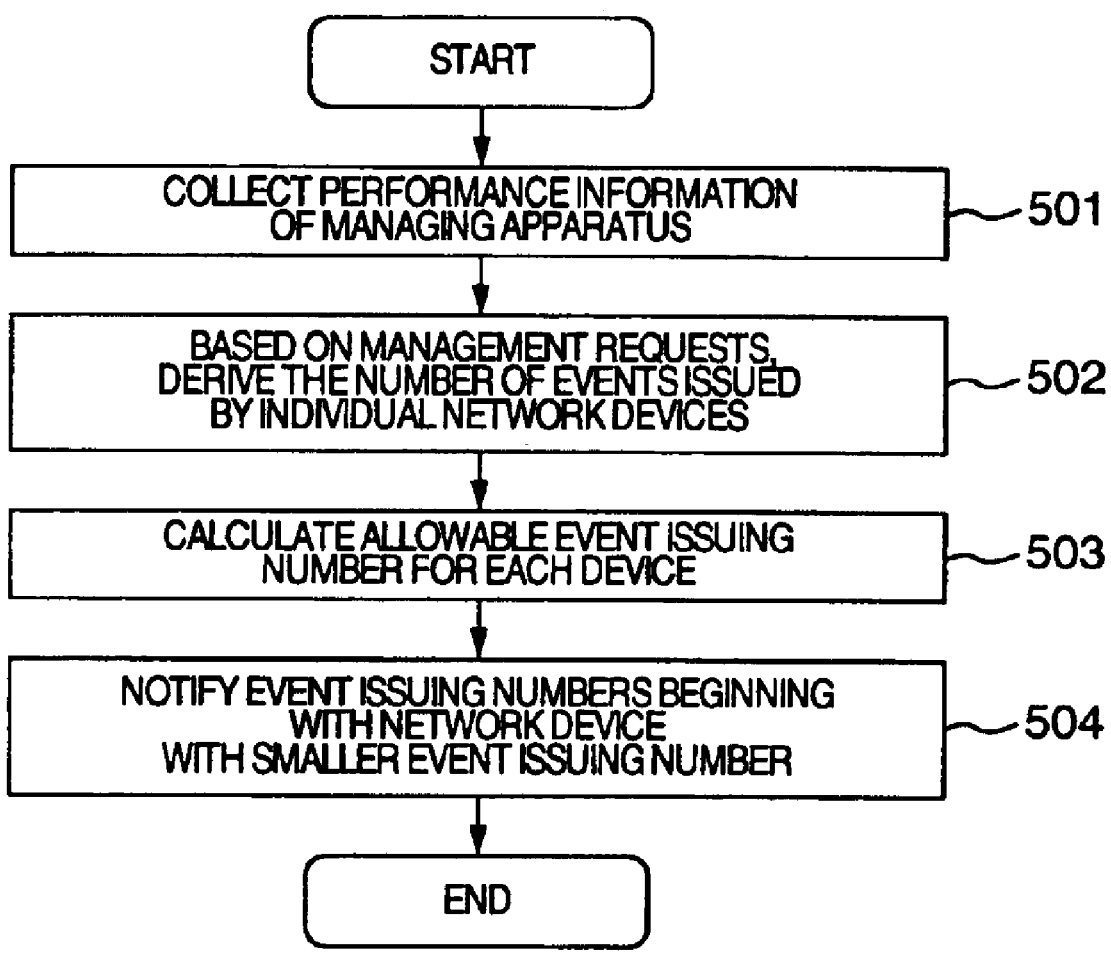
FIG. 5 is a flow chart showing an outline of an event issuing number decision processing residing on the managing apparatus of the first embodiment of the invention.

FIG. 5 is a flow chart showing the steps performed by the event issuing number decision processing unit 143 in the event control program 142.

The event issuing number decision processing unit 143 collects an event handling capability 240 of the managing apparatus 10 and a user profile 260 contained in the management information database 13 when it receives an event control setting request from an operator in charge of operation and management (501).

Next, based on the user profile 260, the event issuing number decision processing unit 143 determines the event type 232 that should be notified from the individual network devices by using the event related table 230 in the management information database 13.

Suppose, for example, there is an element "state check" in the management requests made by the user (it may be set directly by the user or generated based on a request from the user). The event related table 230 of FIG. 2 shows that the requested network device type 233 among the network devices used by the user is ATM, the requested type of managed object 234 representing the input/output resource used by the user is CTP, and the requested event type 232 is a status change notification "state change". Based on the available path information 264 in the management information database 13, the managed object related with user resources is identified from among the corresponding network device type and resource type. The necessary managed objects information may be derived directly from the available path information or indirectly derived by using the management information 210 based on the available path information 264. In the case of USR000001 shown in FIG. 2, there are "state check" and "communication failure" in the management request. Because USR000001 uses Port11 and Port12 of NE01, it is necessary in the case of NE01 to collect a total of six types of events, i.e., state change and communication-Alarm from CTP contained in Port11 and Port12 and communication-Alarm from TTP. Similarly, six types of events are also collected in the case of NE02 and NE03.

In this way, the event information that needs to be forwarded from the network devices 20a, 20b in response to the user request 263 is extracted for each device, and the number of events required for each device (hereinafter referred to as a required event number) is calculated (502).

The number of events that can be issued from each network device is calculated by the following equation (503).

$$Ei = (\alpha i / \Sigma \alpha j) \times TPL$$

where

Ei: the number of events that can be issued from the network device of interest (hereinafter referred to as an allowable event number)

αi: the required event number issued from the network device of interest

Σαj: a sum of required event numbers of the network devices

TPL: the number of events that can be processed by the managing apparatus 10

After the calculation has been done for all network devices, the calculated results, the order of priority and the requested information are provided as the event issuing control information to each of the network devices (504). At this time, the event issuing number decision processing unit also forwards the constitutional elements of a group to which the network device belongs, based on the group configuration 250 contained in the management information database 13, and the number of events issued from these devices.

FIG. 6 shows an event issuing control information 601 notified to the network devices described above. This information includes the allowable event number 602 obtained by the above calculation. It also includes an event type 604, an event priority level 605 and an event issuing condition 606 as event transmission information 603 to be issued from the network device. The event transmission information of FIG. 6 is defined according to the OSI management. In a management based on SNMP, the event ID is an enterprise specific trap identifier included in the trap information.

Further, the event issuing control information of FIG. 6 has group information which consists of other network devices 608 in the group to which the notifying network device belongs and the event issuing control numbers (allowable event numbers 609) of the corresponding network devices.

Figure 7:
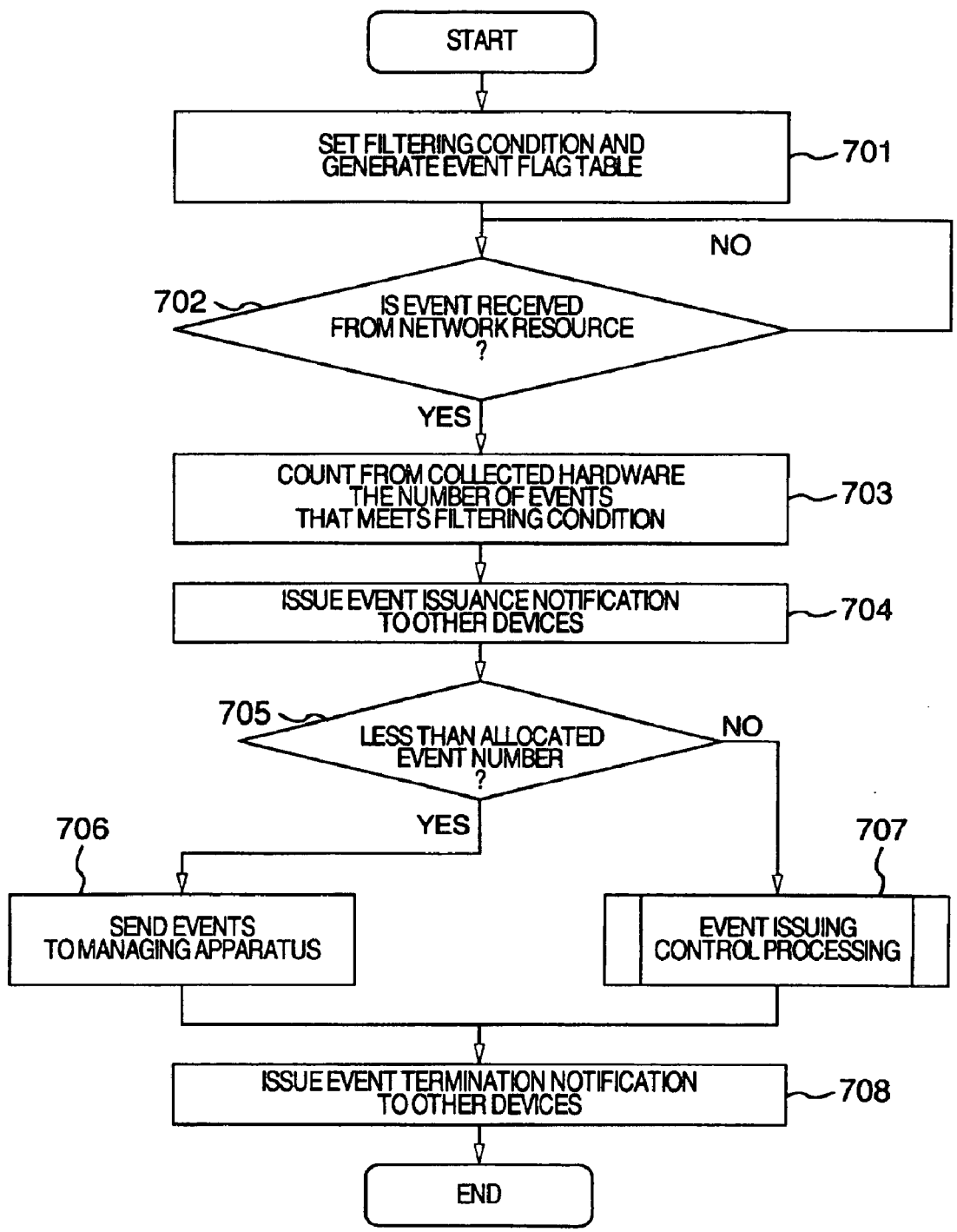
FIG. 7 is a flow chart showing outline overall processing of an event issuing control program on the network devices according to the invention.

FIG. 7 is a flow chart of the processing performed by the event issuing control program on the network device.

The event control parameter setting unit 29 of the event issuing control program 25 determines the event issuing control condition based on the filtering control information from the managing apparatus 10 (701). By using an event issuing control condition that does not consider the event priority level contained in the event transmission information, the event issuing control condition for forwarding individual events is first determined. Then, the condition for allocating the filtered event priority level is created. In the case of the event information of FIG. 6, for example, because the classes of the event type and the event condition are the same, a filter condition is set for forwarding that "CommunicationAlarm" event whose class is "CTP" and whose RDN (Relative Distinguished Name) used to identify the managed object instance, i.e., the entity of the event, is "Port11" or "Port12". Then, a priority level decision condition is created such that, for example, if RDN="Port11" the priority level is 1 and if RDN="Port12" the priority level is 3.

Figure 9:
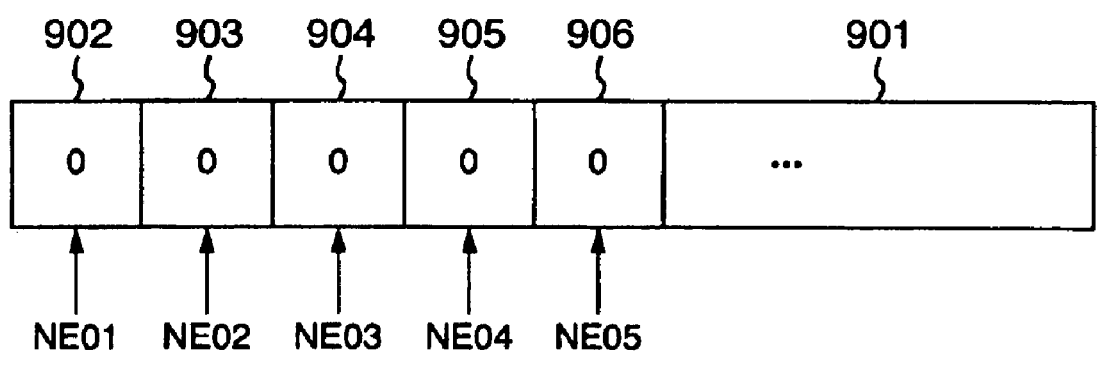
FIG. 9 is a diagram showing an example of an event transmission flag table contained in an event transmission control processing unit on the network devices according to the invention.

The event control parameter setting unit 29, based on the group information of the filtering control information, creates an event issuing flag table 901 for the events issued from the devices belonging to the group, as shown in FIG. 9. The event issuing flag table checks whether any other network device in the group is transmitting an event.

The information shown in FIG. 9 has identifiers 902–906 corresponding to the network devices in the group.

The initialization of the event control by the event control parameter setting unit 29 involves the setting of the event issuing control and the generation of an event issuing flag. The event control parameter setting unit 29 notifies the generated event issuing flag table to the event transmission control unit 28. Based on the received data, the event transmission control unit 28 monitors information from the communication control module and waits for an event issuing signal to be received from devices in the group (702).

Prior to issuing an event to the managing apparatus, the event transmission control unit 28 on each network device forwards an event issuance notification to the event transmission control units 28 on other devices in the group. The event transmission control units 28 on other network devices that have received this notification change the event flag in the flag table corresponding to the device that has dispatched the event issuance notification to an issued state (by changing the value to 1 in the case of FIG. 9).

When it is necessary to forward an event based on the information collected or notified from the network resources, the event issuing control processing first calculates the number of events to be issued (703). If, for example, from the information periodically collected from all network resources, communication failure information, which constitutes a criterion for issuing the "CommunicationAlarm", is found in the information associated with "Port11" and "Port12" of CTP, the number of events that need to be issued is two. Then, the event issuing control processing notifies the network devices in the group that events will be issued (704).

It is checked whether the number of events to be issued is more than the number of events that can be issued from the network device (705). If the event number is smaller than a specified value, the event issuing control program notifies the events to be issued to the managing apparatus 10 (706). When all the events are forwarded, the event issuance end notification is given to other devices. If not, the event issuing control processing (707) that controls the number of events to be issued is executed.

Figure 8:
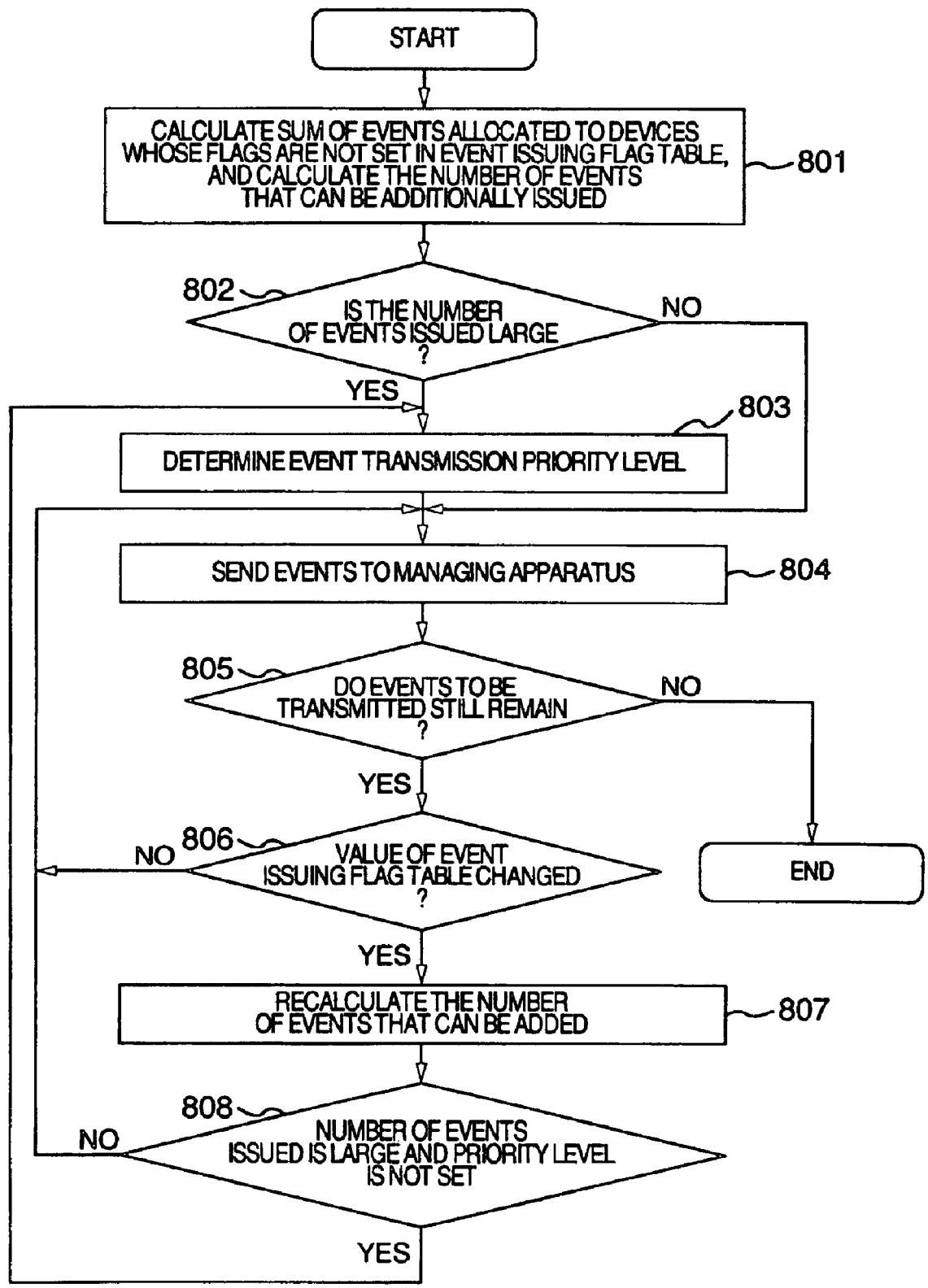
FIG. 8 is a flow chart showing outline processing of the event issuing control program when the event issuing control is performed on the network devices according to the invention.

FIG. 8 is a flow chart representing an outline procedure of the event issuing control processing. First, based on the event information received from the network devices in the group, it is checked whether an upper limit of the event issuing number can be changed (801). This involves checking the event issuing flag table to identify the devices that have not issued events and calculating the total number of events allocated to these devices (available event number). Then, the number of devices that are currently issuing events are calculated and the available event number is divided by the device number to determine the number of events that can be additionally issued (upper limit variation). The upper limit of the event issuing number is changed by that amount.

Then, it is checked whether the number of events to be issued is larger than the allowable upper limit (802). When the number of events to be issued is larger than the allowable upper limit, a priority level setting is performed to determine the order of issuing events according to the priority level condition generated from the filtering control information (803). After this, the events are forwarded to the managing apparatus 10 (804). In this case the number of events issued per unit time is controlled to be equal to or lower than the above control value even if the number of events to be transmitted per unit time is larger than the above control value. For example, if the number of events to be transmitted per unit time is 500 events/sec, the next event is notified to the managing apparatus 0.002 second after the first event has been transmitted.

When the number of event notifications to the managing apparatus exceeds the upper limit, the event issuing flag table is monitored at all times after one event has been transmitted (805) in order to check if there is any change in the event generation in other network devices (806). If there is any change, the event issuing number is immediately reduced to a predetermined upper limit and the available event setting is recalculated (807). Then, a check is made to see if the upper limit on the number of events to be issued should be changed again (808). If the number of remaining events to be issued to the managing apparatus 10 is still large and the priority level setting is not performed, then the event transmission priority level is determined. If the priority level setting processing has already been performed, the number of events to be transmitted to the managing apparatus (in more concrete terms, the intervals at which the events are transmitted) needs only to be changed.

With the above processing, the managing apparatus 10 can avoid receiving events in excess of its processing capability and thus can perform event processing in conformance with its processing capability.

Next, a method of realizing an overall setting phase while alleviating the load of the managing apparatus by changing the location of the event setting program of the event issuing control program will be explained as the second embodiment of the invention by referring to FIGS. 10 to 12.

Figure 10:
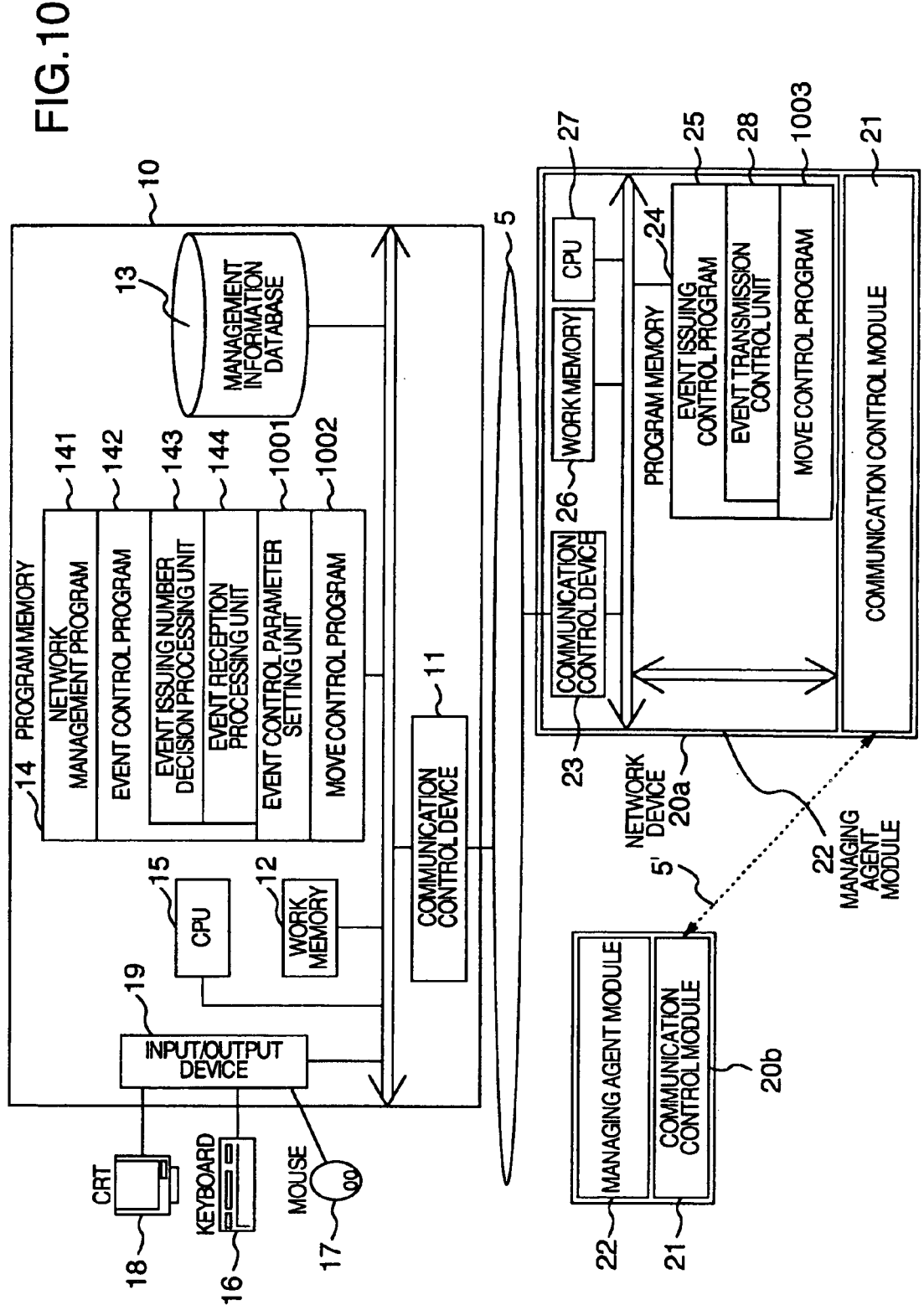
FIG. 10 is a schematic diagram showing a system configuration of a second embodiment of the invention.

FIG. 10 is a schematic diagram showing a configuration of the managing apparatus 10 and the network devices according to this embodiment. Points in which it differs from the configuration of the first embodiment are that the event control parameter setting unit is not on the network devices but resides on the managing apparatus 10 as an event control parameter setting unit 1001, that the event control parameter setting unit 1001 is a mobile program that can be moved onto the network devices as required, and that a move control program 102, 1003 for moving the mobile program resides on the managing apparatus 10 and the network devices 20.

Figure 11:
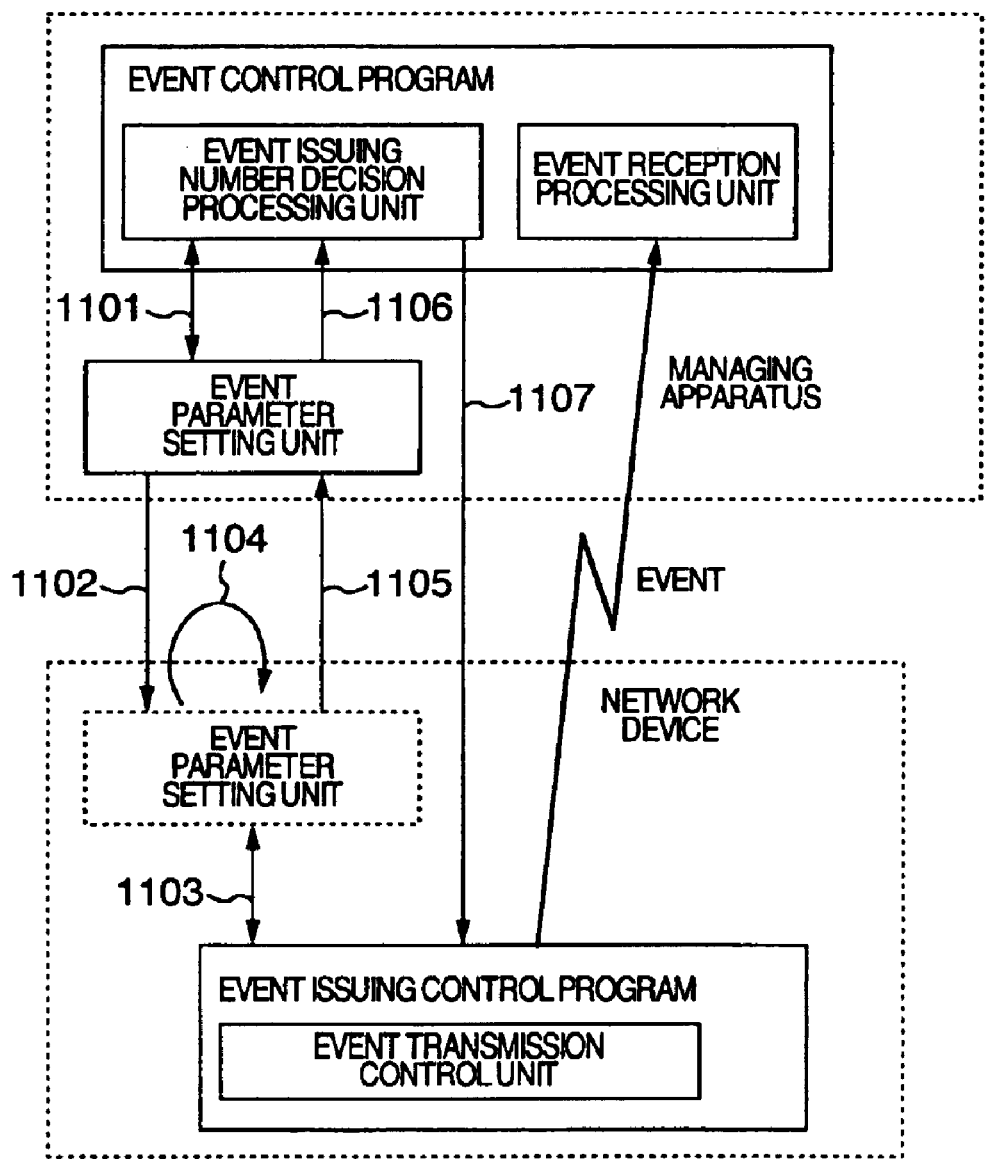
FIG. 11 is a diagram showing a relation among programs associated with the second embodiment of the invention.

FIG. 11 shows a flow of processing among programs according to the second embodiment.

The event issuing number decision processing unit 143 of the event control program 142, upon receiving a management request, determines a necessary event condition from the event information stored in the management information database 13, as in the first embodiment. Then, it transfers the obtained condition and a list of network devices made available to the user to the event control parameter setting unit (1101). The event control parameter setting unit now moves to a corresponding network device according to the received event control processing (1102).

Figure 12:
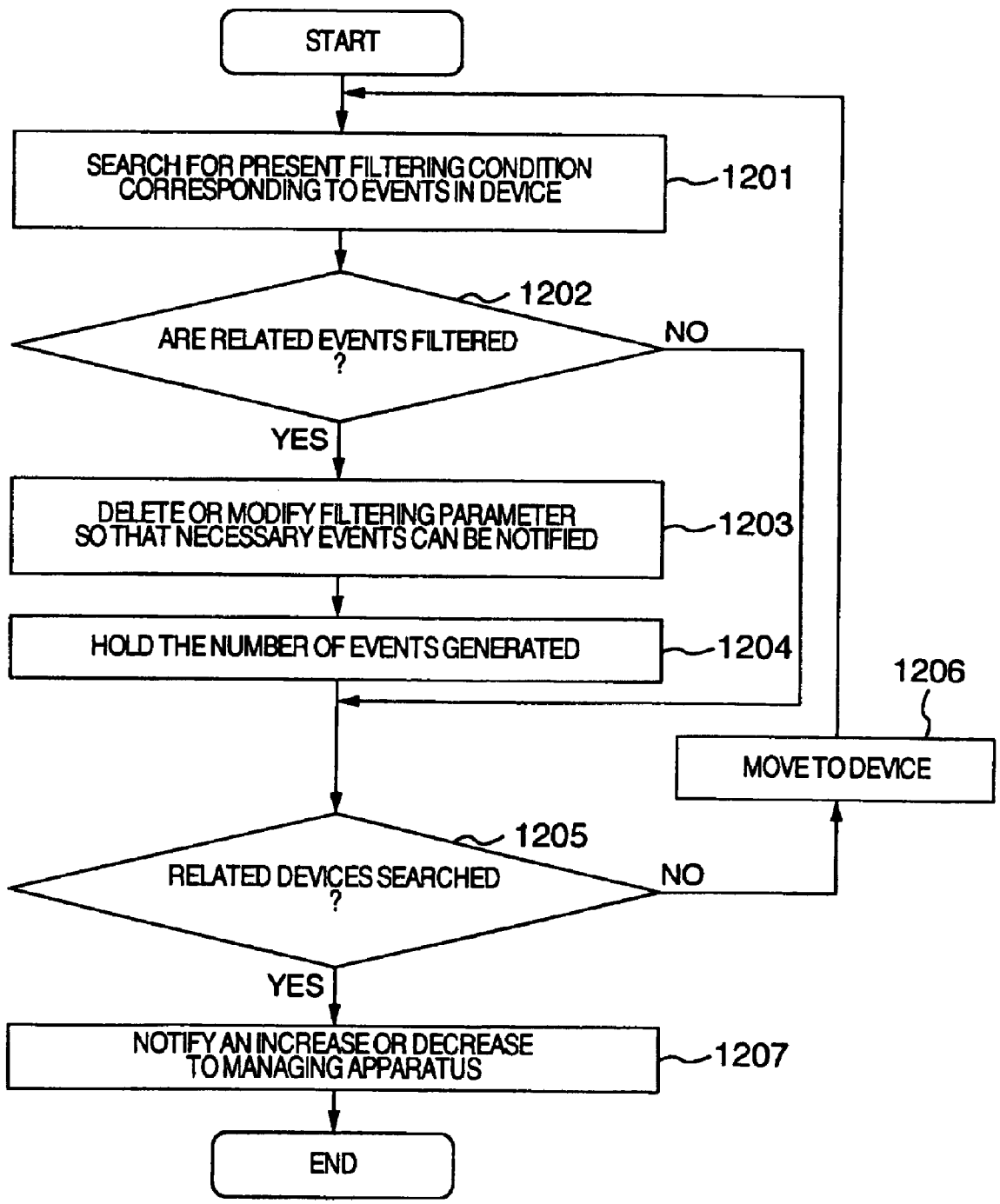
FIG. 12 is a flow chart showing an outline of event control parameter setting processing that moves among the network devices according to the second embodiment of the invention.

FIG. 12 is a flow chart of processing performed by the event control parameter setting unit 1001 according to the second embodiment.

When it moves from the managing apparatus 10 onto a moving path and one of the network devices, the event control parameter setting unit 1001 collects the present event filter condition set and held in the event transmission control unit on the device (1201). Then, it is checked based on the collected filter condition whether the associated event is filtered or not (1202).

If the associated event is filtered by the event control processing, the event issuing control condition is modified so that the event in question will not be filtered (1203). For example, if in the event issuing control condition there is a "Statechange" notification to be forwarded and the only managed objects of the event to be forwarded are "Port 11", and "Port 12", and if the event needs to be transmitted from a managed object "Port 13", the filter condition is changed to enable the "Port 13", to transmit the event. This processing can involve deleting an event condition depending on circumstances.

Next, from the configuration of the existing managed objects, the type of event to be issued, and the filtering parameter, the event control parameter setting processing derives an increased number of events that has occurred as a result of changing the filtering parameter. Then, the event number is maintained (1204).

With the above procedure, the event control parameter setting processing sets the event issuing control condition in the event issuing control program.

Further, the event control parameter setting processing checks whether the processing has been done for all specified network devices (1205). If there are network devices that require processing, the event control parameter setting program is moved by the move control program onto the device (1206) and repeats the above processing (1104).

When the above processing on the final network device is finished, the event control parameter setting program moves to the managing apparatus 10 (1105) and notifies the filtering parameter set by the event filter setting and the event increase or decrease to the event control program on the managing apparatus 10 (1106, 1207).

Upon receiving the increased or decreased number of events issued, the event issuing number decision processing unit in the event control program sets an allowable event number for each network device based on the increased or decreased event number (1107). This processing checks a threshold value contained in the event issuing number decision processing to decide whether or not to execute the change processing. For example, if the number of events for an arbitrary number of devices increases by 50% or more from the number of events before modification, the restriction on events can be reallocated to change an event number increase per unit time. If the event number increase is within 50%, the upper limit on the number of events transmitted from that device is not changed.

With the above processing, the event control environment on each network device can be set. The event issuing control for the network device when an event is generated is the same as the first embodiment.

With the above configuration, the condition for controlling event issuance from each device can be searched and set on the device itself, which in turn makes it possible to reduce the required management operation when the event control is set and also alleviate the load of the managing apparatus.

By changing the upper limit on the event number change based on the event number increase for each device, it is possible to perform the event transmission control without affecting any other network devices when a user is added or a management request is changed.

As described in the embodiments of the invention, during the event transmission processing performed on the network device, the number of events to be transmitted is set according to the capability of the managing apparatus 10 to keep the event processing by the managing apparatus 10 always within its processing capability. Therefore, if the number of events becomes large, necessary events can be received without degrading the performance of the managing apparatus 10.

Further, the network device checks the event issuing states of other associated network devices before transmitting events to the managing apparatus 10 and therefore can perform the event transmission control dynamically according to the situation. Thus, if one device issues a particularly large number of events, the event processing capability of the managing apparatus can be prevented from being degraded too much. Conversely the number of events that can be transmitted can be fully taken advantage of.

Further, by realizing the event setting processing with a mobile program, the event filter setting processing can be distributed, reducing the load of the managing apparatus 10 and the network load.

Further, by realizing the event setting processing with a mobile program, the event filter setting processing can be distributed, reducing the load of the managing apparatus during the event setting and the load of the communication traffic for management.

With the embodiments of the invention, the events notified to the managing apparatus can be kept within the event processing capability of the managing apparatus, further enhancing the possibility of the managing apparatus being able to reliably process the events notified.

What is claimed is:

1. A network management system comprising:
    one or more network devices; and
    a managing apparatus for managing the network device;
    wherein the managing apparatus has a means for determining the number of events issuing for each network device based on the number of processing events on the managing apparatus by extracting the event information to be forwarded from the network devices to calculate the number of events required for each device, and a means for notifying an event issuing control condition including said number of events issuing, an order of priority and requested information to each network device;
    wherein the network device has a means for performing an event issuing control according to the event issuing control condition notified from the managing apparatus.

2. A network management system according to claim 1,
wherein the managing apparatus has a means for setting an event priority level in the event issuing control condition to be notified to the network device, the event priority level being issued by the network device according to a management request;
wherein the means of the network device for performing the event issuing control has a means for issuing events according to the set priority level when limiting the number of events to be issued.

3. A network management system according to claim 1, further including other network devices;
wherein the management apparatus has a means for setting information on the other network devices which are not the same as the network device notified in the event issuing control condition;
wherein the network device receiving the event issuing control condition has a means for issuing to the other network devices an event issuance notification before issuing the event to the managing apparatus and an event termination notification after issuing the event.

4. A network management system according to claim 3, wherein each network device comprising:
a means for controlling the event issuance;
a means for holding the event issuance notification and the event termination notification from the network device; and
a means for checking, when an event is to be issued to the managing apparatus, an event reception state of the managing apparatus based on the event issuance notification and event termination notification held and changing the event issuing control condition set in the network device.

5. A network management system according to claim 1, further including an event control parameter setting means moved from the managing apparatus to the network device along with the necessary event transmission information;
wherein the event control parameter setting means comprises:
a means for changing the event issuing control condition already set in the network device according to the event transmission information;
a means for determining according to the changed event issuing control condition an increased or decreased number of events issued by the network device and holding the determined number; and
a means moved to the managing apparatus to notify the increased or decreased number of events to the managing apparatus;
wherein the managing apparatus has a means for setting the event issuing control condition based on the notified increased or decreased number of events.

6. A network management method
wherein a network management system is constructed of a network device and a managing apparatus for managing the network device;
wherein the managing apparatus determines an event issuing control condition of the network device based on an event processing capability of the managing apparatus and notifies the event issuing control condition to the network device, wherein the event issuing control condition is determined by determining the number of events issuing for the network device by extracting the event information to be forwarded from the network devices to calculate the number of events required for each device and based upon a number of processing events on the managing apparatus;
wherein the network device performs an event issuing control according to the event issuing control condition notified from the managing apparatus.

7. A network management method according to claim 6,
wherein the managing apparatus sets, according to a management request, an event priority level issued from the network device in the event issuing control condition to be notified to the network device, and
the event issuing control by the network device, when it limits the number of events to be issued, issues events according to the set event priority level.

8. A network management method according to claim 6,
wherein other network devices are provided;
wherein the managing apparatus has provided in the event issuing control condition notified to the network device a means associated with the other network devices;
wherein the network device has a means for issuing to the other network devices an event issuance notification before issuing the event to the managing apparatus and an event termination notification after issuing the event.

9. A network management method according to claim 8,
wherein the other network devices
control the event issuance and hold the event issuance notification and event termination notification from the network device and,
when an event is to be issued to the managing apparatus, check an event reception state of the managing apparatus by using the event issuance notification and event termination notification held and change the event issuing control condition set in the local network device.

10. A network management method according to claim 6,
wherein an event control parameter setting means for setting an event control parameter adapted to be moved from the managing apparatus to the network device along with necessary event transmission information is provided;
wherein the event control parameter setting means
changes, according to the event transmission information, the event issuing control condition already set in the network device,
according to the changed event issuing control condition, determines and holds an increased or decreased number of events issued by the network device, and
notifies the increased or decreased number of events to the managing apparatus;
wherein the managing apparatus sets the event issuing control condition based on the notified increased or decreased number of events.

* * * * *